(12) United States Patent  
Deng et al.

(10) Patent No.: US 9,326,007 B2  
(45) Date of Patent: Apr. 26, 2016

(54) MOTION COMPENSATED DE-BLOCKING

(75) Inventors: Xiaoyun Deng, Singapore (SG); Patricia Wei Yin Chiang, Singapore (SG); Lucas Hui, Singapore (SG)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 559 days.

(21) Appl. No.: 13/293,978

(22) Filed: Nov. 10, 2011

(65) Prior Publication Data

US 2013/0121424 A1  May 16, 2013

(51) Int. Cl.
| | |
|---|---|
| *H04N 7/26* | (2006.01) |
| *H04N 19/86* | (2014.01) |
| *H04N 19/139* | (2014.01) |
| *H04N 19/176* | (2014.01) |
| *H04N 19/117* | (2014.01) |

(52) U.S. Cl.
CPC ............. *H04N 19/86* (2014.11); *H04N 19/117* (2014.11); *H04N 19/139* (2014.11); *H04N 19/176* (2014.11)

(58) Field of Classification Search
CPC .................. H04N 19/00218; H04N 19/00278; H04N 19/117; H04N 19/139; H04N 19/86; H04N 19/176
USPC ............... 375/240.27, 240.29, E7.19, E7.193
See application file for complete search history.

(56) References Cited

U.S. PATENT DOCUMENTS

| | | | |
|---|---|---|---|
| 7,778,480 B2 | 8/2010 | Huang et al. | |
| 8,326,075 B2 * | 12/2012 | Wilkins et al. | 382/268 |
| 2005/0013494 A1 * | 1/2005 | Srinivasan et al. | 382/233 |
| 2005/0207492 A1 * | 9/2005 | Pao | 375/240.16 |
| 2009/0097575 A1 * | 4/2009 | Teng et al. | 375/240.27 |
| 2009/0274215 A1 * | 11/2009 | Metsugi | 375/240.16 |
| 2010/0091880 A1 * | 4/2010 | Jia | 375/240.25 |
| 2010/0329362 A1 * | 12/2010 | Choi et al. | 375/240.29 |
| 2011/0110427 A1 * | 5/2011 | Teng et al. | 375/240.16 |

* cited by examiner

*Primary Examiner* — William C Vaughn, Jr.  
*Assistant Examiner* — Naod Belai  
(74) *Attorney, Agent, or Firm* — Allen, Dyer, Doppelt, Milbrath & Gilchrist, P.A.

(57) ABSTRACT

Digital noise removal methods and systems for picture quality improvement on next generation high quality set-top-box and digital TV SOCs is disclosed with particular to a de-blocking method and system that is effective on on-grid and off-grid blocky artifacts generated by lossy video compression standards. Blocky artifacts are filtered by extracting motions vectors for a current pixel block, calculating off-grid positions based on the extracted motion vectors, and applying de-blocking filtering along the calculated off-grid positions. The methods and systems can further skip filtering on-grid blocky artifacts to be filtered by an on-grid de-blocking filter known in the art.

15 Claims, 5 Drawing Sheets

MOTION COMPENSATED DE-BLOCKING

FIELD OF THE INVENTION

The present invention relates to digital noise removal methods and systems for picture quality improvement, and, in particular, to a de-blocking method and system that is effective on all types of blocky artifacts generated by lossy video compression standards.

BACKGROUND OF THE INVENTION

Blocky artifacts are problems in block-based motion compensation and/or transform coding algorithms used in many video codec standards. A block-based codec divides a video frame into various blocks and sub-blocks as sub-units in compression; thus, artifacts are apparent in the edges of the various blocks where a visible disconnect exists between the boundary of neighboring blocks. De-blocking filtering is needed to enhance the visual quality of block-based compression.

U.S. Pat. No. 7,778,480 B2, "Block Filtering System for Reducing Artifacts and Method," to Huang et al. discloses one de-blocking filter to reduce blocking artifacts caused by block-based motion compensation algorithms and block coding algorithms. The de-blocking filter, based on bitstream information and image content analysis, is applied on an 8×8 block-grid to effectively reduce blocking artifacts while preserving visual quality of various elements of the frame, i.e. edges and texture details.

However, due to forward (recursive) motion compensation from frame to frame, blocky artifacts generated in one frame can be propagated to subsequent frames. This is especially apparent in code standards without in-loop filters. When a frame does not align to an original block-grid, as is when the frame is created by block-based motion compensation, the propagated blocky artifacts are also no longer aligned to the original block-grid but is decided by the amount of motion; hence, the blocky artifacts are off-grid.

Conventional de-blocking filters act on block-grids. While conventional filters are able to remove most of the on-grid blocky artifacts, off-grid blocky artifacts remain as undesirable distortion to the video, particularly in very low bit-rate internet compression.

Accordingly, there is a need in the art for a method and system to remove off-grid blocky artifacts generated by lossy video compression standards.

SUMMARY OF THE INVENTION

Accordingly, the invention is directed to methods and systems for motion compensated de-blocking of all types of blocky artifacts generated by lossy video compression.

An objective of an embodiment of the invention is to provide a system for motion compensated de-blocking that removes on-grid and off-grid blocky artifacts. A further objective of another embodiment is to provide a system that works with an on-grid de-blocking filter.

Another objective of an embodiment of the invention is to provide a method for off-grid positions calculation that calculates blocking noise positions. A further objective of another embodiment is to provide a method for off-grid positions calculation that calculates blocking noise positions for only anchor frames.

Yet another objective of an embodiment of the invention is to provide a method for de-blocking filtering on-grid and off-grid blocky artifacts. A further objective of another embodiment is to provide a method for deblocking filtering only off-grid blocky artifacts.

Additional features and advantages of embodiments of the invention will be set forth in the description which follows, and will be apparent from the written description and claims hereof, as well as the appended drawings.

According to an aspect of an embodiment of the invention, an apparatus for motion compensated de-blocking comprises a de-blocking filter and a blocking noise positions calculation unit. According to another aspect of an embodiment of the invention, the de-blocking filter comprises an on-grid de-blocking filter and a second de-blocking filter coupled to the on-grid de-blocking filter.

According to an aspect of an embodiment of the invention, a method of blocking noise position calculation comprises retrieving decoder information, retrieving stored blocking noise positions of a reference frame, checking a coding type of a current block and resetting blocking noise positions if the current block is an intra-coded block, checking a coded block pattern of the current block and calculating and updating blocking noise positions if the current block is not an intra-coded block and if the coded block pattern is skipped transformation, checking a type of frame of a current frame and storing the blocking noise positions of the reference frame if the current frame is an anchor frame, and repeating the method if there are more block/frames to process. According to another aspect of an embodiment of the invention, the method skips to repeating the method after retrieving stored blocking noise positions if the current frame is not an anchor frame.

According to an aspect of an embodiment of the invention, a method of de-blocking filtering comprises receiving image data, receiving a plurality of decoder information, receiving blocking noise positions, applying de-blocking filtering, and repeating the method if there are more block/frames to process. According to another aspect of an embodiment of the invention, the method further comprises skipping to repeating the method after receiving blocking noise positions if the received blocking noise position is on-grid.

According to an aspect of an embodiment of the invention, a method of motion compensated de-blocking of a current picture of a video comprises extracting one or more motion vectors for a current pixel block of the picture, calculating one or more positions based on the extracted motion vectors, and applying de-blocking filtering along the calculated positions.

The foregoing and other features, utilities and advantages of the invention will be apparent from the following more particular description of an embodiment of the invention as illustrated in the accompanying drawings.

DETAILED DESCRIPTION

Embodiments of the present invention are hereafter described in detail with reference to the accompanying figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying figures is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

Reference will now be made in detail to embodiments of the present invention, examples of which are illustrated in the accompanying drawings.

Figure 1:
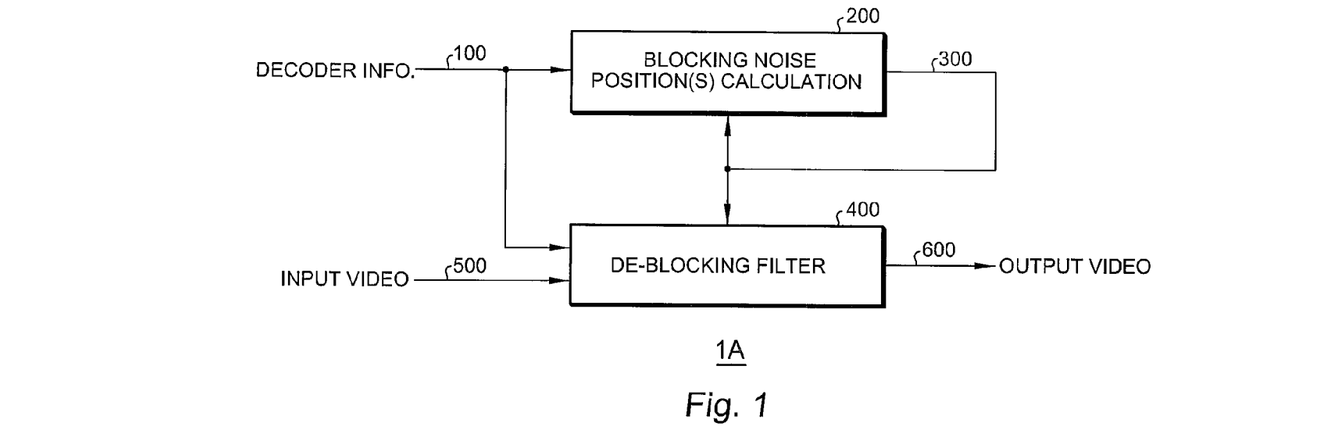
FIG. 1 illustrates an exemplary diagram of a motion compensated de-blocking system according to an embodiment of the invention.

FIG. 1 illustrates a motion compensated de-blocking system for blocking noise reduction in video according to an embodiment of the invention.

Motion compensated de-blocking system 1A receives an input video 500 comprising a plurality of decoded video frames and a plurality of decoder information 100 from a decoder decoding a compressed video of input video 500, and outputs a digital-noise-reduced video signal 600. Motion compensated de-blocked system 1A comprises blocking noise position(s) calculation unit 200 and de-blocking filter unit 400. The plurality of decoder information 100 comprises extracted information from the decoder, i.e. extracted motion vectors, current block intra-inter coded information, coded block or skipped transform information, about input video 500.

Blocking noise position(s) calculation unit 200 is configured to receive the plurality of decoder information 100 and stored blocking noise position(s) from one or more previous frame(s), and outputs calculated blocking noise position(s) 300. The previously calculated blocking noise position(s) may be stored and accessed internally in block noise position(s) calculation unit 200 or may be stored and accessed externally. An exemplary implementation of blocking noise position(s) calculation by blocking noise positions(s) calculation unit 200 is described below with respect to FIGS. 3 and 4.

De-blocking filter unit 400 receives input video signal 500, the plurality of decoder information 100 from a decoder, and calculated blocking noise position(s) 300, and outputs a noise reduced video signal 600. The de-blocking filter 400 may be applied to both on-grid and off-grid blocking noise based on the calculated blocking noise position(s) provided by blocking noise position(s) calculation unit 200. An exemplary implementation of a de-blocking filter by de-blocking filter unit 400 is described below with respect to FIGS. 5 and 6.

Figure 2:
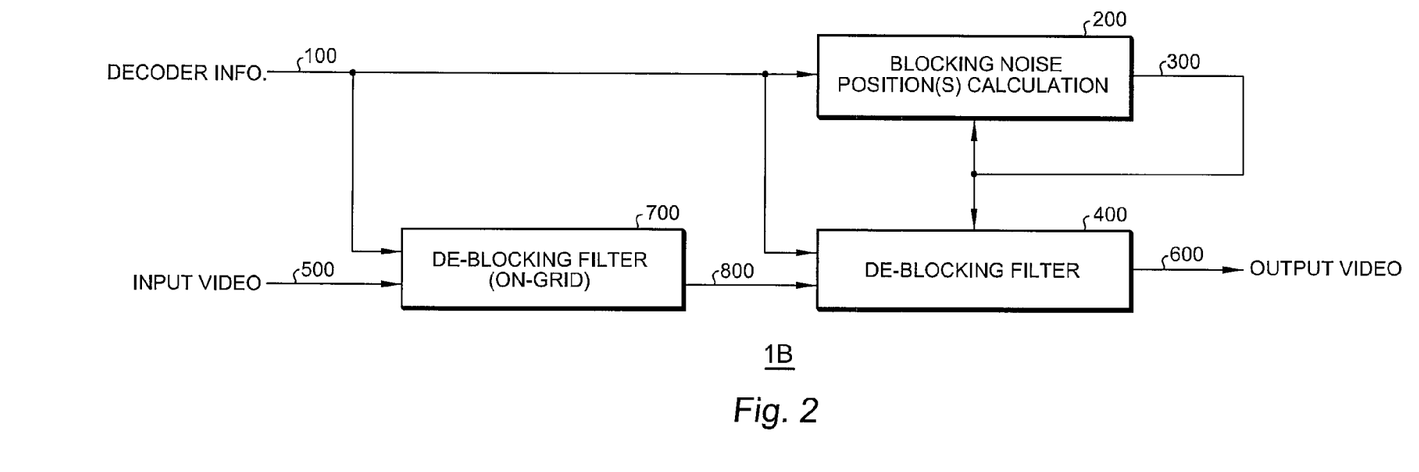
FIG. 2 illustrates an exemplary diagram of a motion compensated de-blocking system according to another embodiment of the invention.

FIG. 2 illustrates an alternate motion compensated de-blocking system according to another embodiment of the invention.

Motion compensated de-blocking system 1B comprises blocking noise position(s) calculation unit 200, de-blocking filter for on-grid blocking noise 700 and a second de-blocking filter 400.

Blocking noise position(s) calculation unit 200 receives a plurality of decoder information 100 and previously calculated blocking noise position(s), and outputs the latest calculated blocking noise position(s) 300. The previously calculated blocking noise position(s) may be stored and accessed internally in block noise position(s) calculation unit 200 or may be stored and accessed externally. An exemplary implementation of blocking noise position(s) calculation by blocking noise positions(s) calculation unit 200 is described below with respect to FIGS. 3 and 4.

De-blocking filter for on-grid blocking noise 700 receives an input video signal 500, a plurality of decoder information 100 from a decoder, and outputs a video output with reduced on-grid blocking noise 800. An example embodiment of 700 is disclosed in U.S. Pat. No. 7,778,480 B2.

De-blocking filter unit 400 receives the video with reduced on-grid blocking noise 800, the plurality of decoder information 100, and the calculated blocking noise position(s) 300, and outputs a video signal 600 with all types of blocking noise reduced. In one aspect of the invention, de-blocking filter 400 may be applied only to off-grid blocking noise position(s) since de-blocking filter 700 is available to de-block on-grid blocking noise in the system. An exemplary implementation of a de-blocking filter by de-blocking filter unit 400 is described below with respect to FIGS. 5 and 6.

In one aspect of the invention, motion compensated de-blocking systems 1A and 1B may be applied to horizontal and/or vertical motion independently, and/or to luma and/or chroma channel independently.

Figure 3:
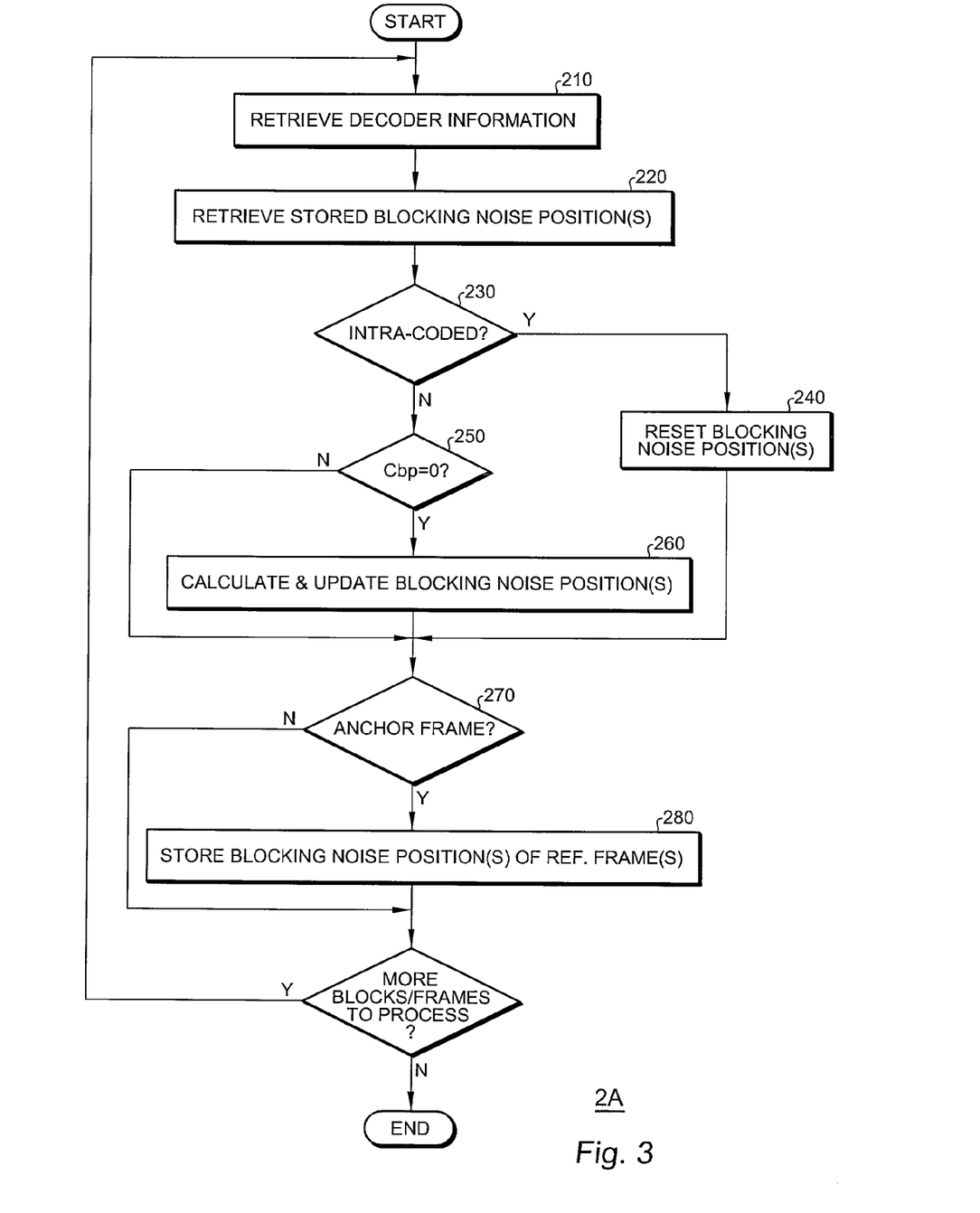
FIG. 3 illustrates an exemplary diagram of a blocking noise position(s) calculation method according to an embodiment of the invention.

FIG. 3 illustrates blocking noise position(s) calculation method according to one embodiment of the invention.

Blocking noise position(s) calculation method 200A comprises the steps of retrieving decoder information 210, retrieving the stored blocking noise position(s) 220, checking coding type of current block 230, resetting blocking noise position(s) 240 for an intra-coded block, checking the coded block pattern of current block 250, calculating and updating blocking noise position(s) 260, checking type of frame 270, and storing the blocking noise position(s) of the reference frame(s) 280.

The step of retrieving decoder information 210 further comprises steps of retrieving the coded picture type, retrieving intra/inter coded information, retrieving coded block pattern or skipped transform information, and retrieving one or more motion vectors from current pixel block of current picture and co-sited pixel block(s) from one or more previous decoded pictures. These information retrieved are normally provided by a decoder decoding the input video, but may also be calculated or otherwise derived as known in the art. In one aspect of the invention, the retrieved motion vectors could also be a combination of the motion vectors from a neighborhood of pixel blocks from current and previous decoded pictures.

The step of retrieving the stored blocking noise position(s) 220 is to obtain the previously calculated blocking noise position(s) from the reference frames for the position(s) calculation of the current frame. The reference frames could be forward, backward, forward and backward interpolated, etc. according to the direction of the motion compensation.

The step of checking coding type of current block 230 is to check if the current block is intra-coded based on the retrieved intra/inter coded information from the decoder in the step of retrieving decoder information 210. If the current block is intra-coded, the blocking noise position(s) posx/posy are reset in the step of resetting blocking noise position(s) 240 for an intra-coded block as in Eqn 1 (a) and (b).

$$posx=0 \qquad \text{Eqn 1 (a)}$$

$$posy=0 \qquad \text{Eqn 1 (b)}$$

If the current block is inter-coded, the coded block pattern retrieved from the step of retrieving the stored blocking noise position(s) 220 is checked in the step of checking the coded block pattern of current block 250. If and only if when the coded block pattern is '0' (skipped transformation) are the blocking noise position(s) calculated and updated in the step of calculating and updating blocking noise position(s) 260. Otherwise the previously calculated blocking noise position(s) posx/posy are provided to a de-blocking filter, i.e. de-blocking filter 400, without any updates.

Equations 2 (a) and (b) illustrate an example of the step of calculating and updating blocking noise position(s) 260 in which one or more blocking noise positions posx/posy for an inter-coded skipped block of 8×8 pixels is calculated based in one or more previously stored blocking noise positions sposx/sposy of the reference frames, and one or more extracted motion vectors MVx/MVy from the current block of the current picture and co-sited block(s) from the previous picture(s). The calculated blocking noise position(s) posx/posy are then provided to a de-blocking filter, i.e. de-blocking filter unit 400, for candidate filter window extraction.

$$posx = \begin{cases} (sposx + (8 - MVx \,\&7))) \,\&7 & MVx > 0 \\ (sposx + (\text{abs}(MVx))) \,\&7 & \text{otherwise} \end{cases} \qquad \text{Eqn 2 (a)}$$

$$posy = \begin{cases} (sposy + (8 - MVy \,\&7))) \,\&7 & MVy > 0 \\ (sposy + (\text{abs}(MVy))) \,\&7 & \text{otherwise} \end{cases} \qquad \text{Eqn 2 (b)}$$

In order to store the calculated blocking noise position(s) for only the reference frames, the step of checking type of frame 270 is carried out to check if the current frame is an anchor frame (i.e. 'I' or 'P' frame).

In the step of storing the blocking noise position(s) of the reference frame(s) 280 the blocking noise position(s) of the reference frames sposx/sposy are updated and stored as illustrated in Equations 3 (a) and (b). The stored position(s) sposx/sposy are then provided to a blocking noise positions(s) calculating unit, i.e. blocking noise position(s) calculation 200, of the next frame.

$$sposx=posx \qquad \text{Eqn 3 (a)}$$

$$sposy=posy \qquad \text{Eqn 3 (b)}$$

When the current frame is determined to be non-anchor frame in the step of checking type of frame 270, there would not be any updating or storing of the reference blocking noise position (s) sposx/sposy. More than one blocking noise positions may need to be stored for bi-directional motion compensated blocks in 'B' frames.

Figure 4:
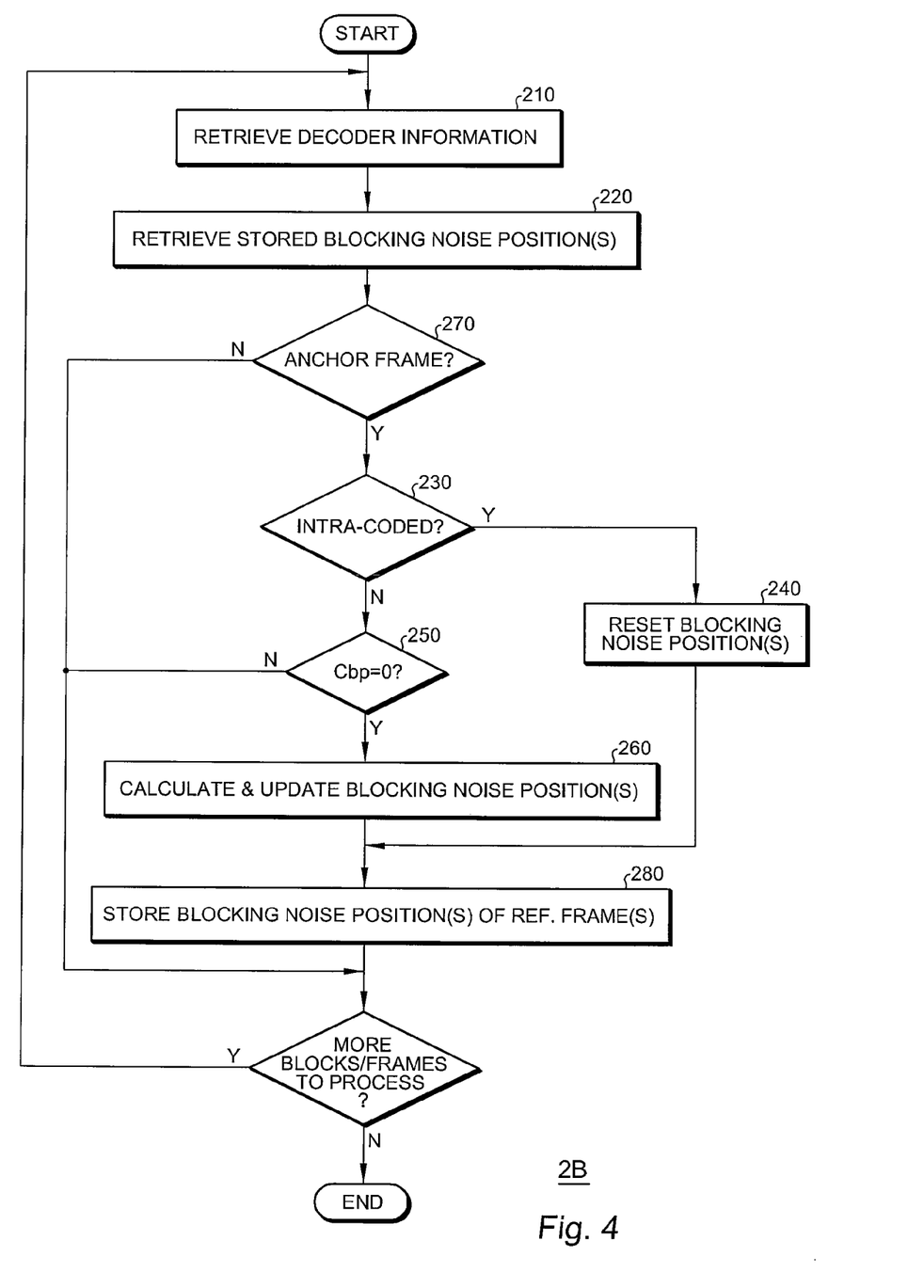
FIG. 4 illustrates an exemplary diagram of a blocking noise position(s) calculation method according to another embodiment of the invention.

FIG. 4 illustrates an alternate blocking noise position(s) calculation method according to another embodiment of the invention.

Blocking noise position(s) calculation method 2B comprises steps of retrieving decoder information 210, retrieving the stored blocking noise position(s) 220, checking type of frame 270, checking coding type of current block 230, resetting blocking noise position(s) 240 for an intra-coded block, checking the coded block pattern of current block 250, calculating and updating blocking noise position(s) 260 and storing the blocking noise position(s) of the reference frame(s) 280.

Blocking noise position(s) calculation method 2B differs from block noise positions(s) calculation method 2A in that the type of frame is checked in the step of checking type of frame 270 before any calculation of the blocking noise position(s); hence, the blocking noise position(s) are only calculated and updated for anchor frames. Therefore, the stored blocking noise position(s) sposx/sposy of the reference frame(s) from the step of storing the blocking noise position(s) of the reference frame(s) 280 are the same as the calculated blocking noise position(s) posx/posy from the step of calculating and updating blocking noise position(s) 260 and/or the step of resetting blocking noise position(s) 240 for an intra-coded block. These position(s) are then provided to a de-blocking filter, i.e. de-blocking filter 400, of the current frame and a blocking noise position(s) calculation unit, i.e. blocking noise position(s) calculation unit 200, of the next frame.

Figure 5:
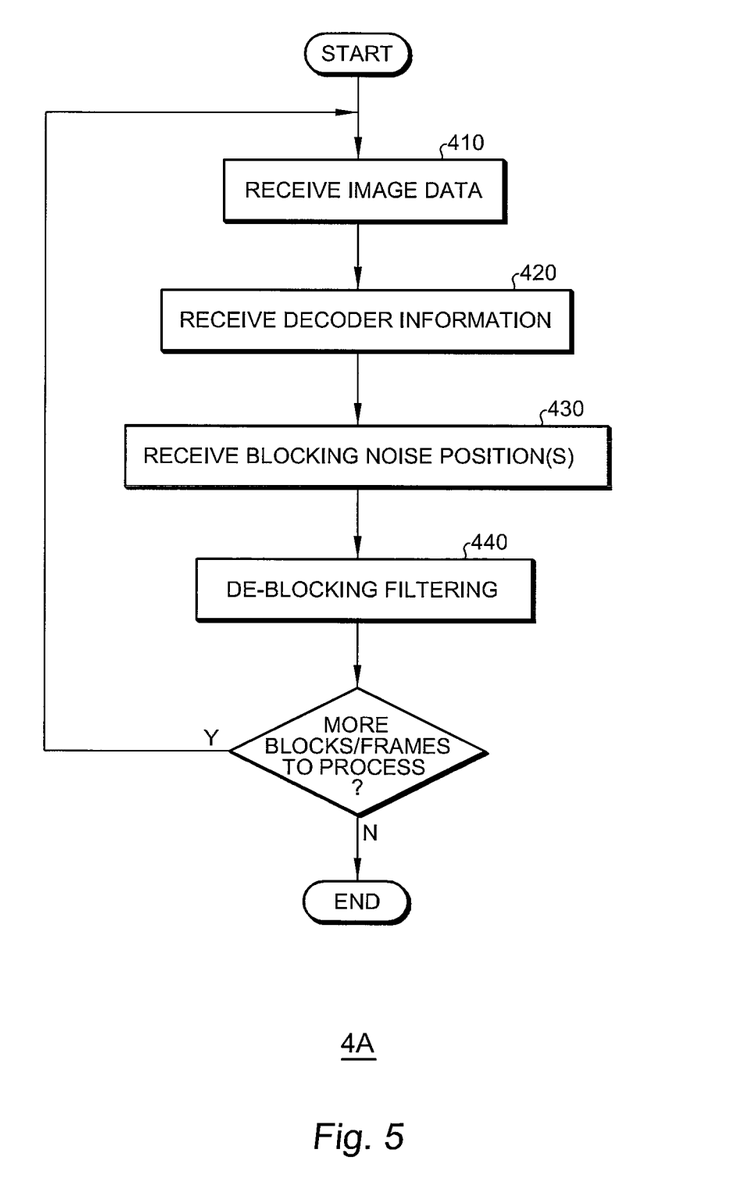
FIG. 5 is an exemplary diagram of a de-blocking method according to an embodiment of the invention.

FIG. 5 illustrates de-blocking filtering method according to an embodiment of the invention.

De-blocking filtering method 4A comprises steps of receiving image data 410, receiving a plurality of decoder information 420, receiving blocking noise position(s) 430, and de-blocking filtering 440. Example embodiments of the step of receiving image data 410, receiving a plurality of decoder information 420, and de-blocking filtering 440 are disclosed in U.S. Pat. No. 7,778,480 B2.

The step of receiving blocking noise position(s) 430 further comprises extracting candidate pixel window(s) centered at the provided blocking noise position(s) for every vertical and horizontal blocking noise.

Figure 6:
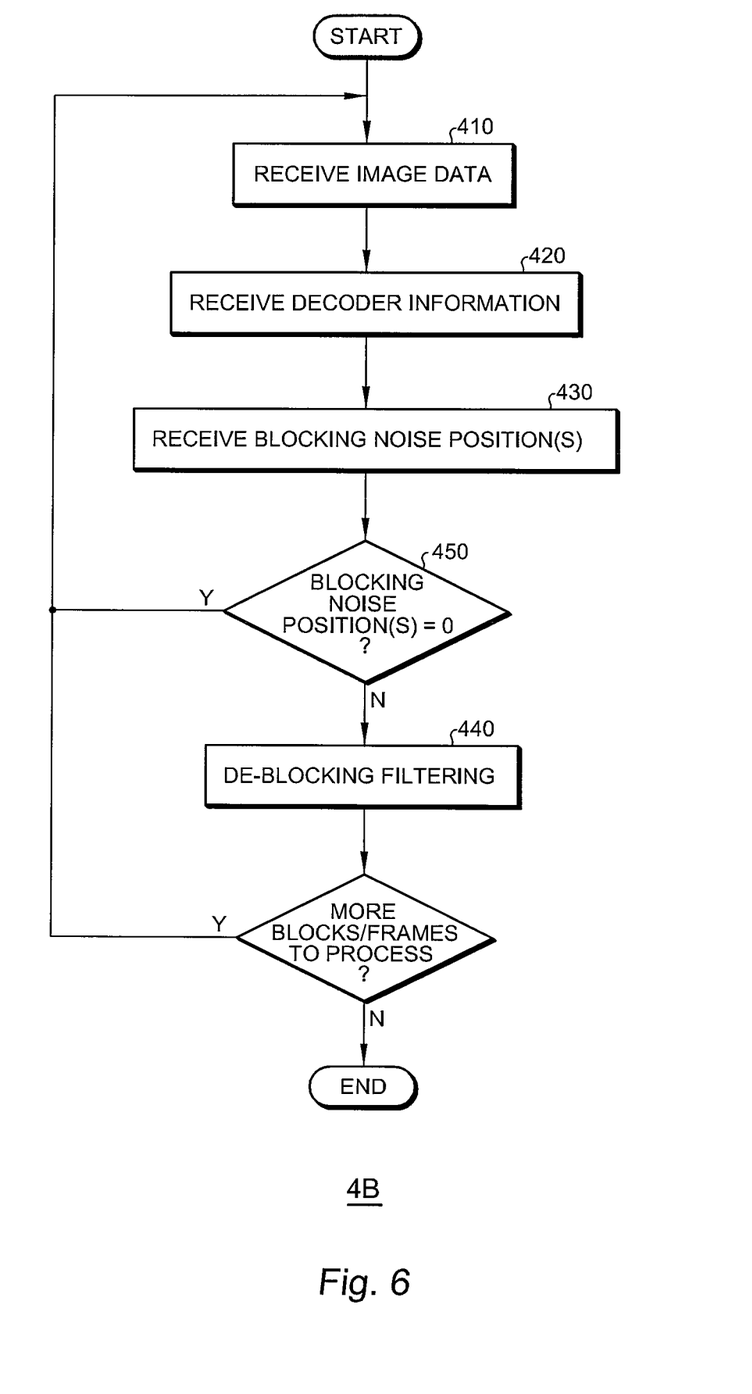
FIG. 6 is an exemplary diagram of a de-blocking method according to another embodiment of the invention.

FIG. 6 illustrates an alternate de-blocking filtering method according to another embodiment of the invention.

De-blocking filtering method 4B comprises steps of receiving image data 410, receiving a plurality of decoder information 420, receiving blocking noise position(s) 430, checking if blocking noise position(s) are off-grid 450, and de-blocking filtering 440.

De-blocking filtering method 4B differs from de-blocking filtering method 4A in that de-blocking filtering in de-blocking filtering method 4B is applied only when the blocking noise position(s) are off-grid. Hence, additional on-grid de-blocking filter may be required in order to remove all types of blocking noise.

Further, a method of motion compensated de-blocking is disclosed according to one embodiment of the invention.

The method comprises extracting one or more motion vectors for a current pixel block, calculating one or more off-grid positions based on the extracted motion vector(s), and applying de-blocking filtering along the calculated off-grid position. De-blocking filter applied as known in the art.

In one aspect of the invention, motion vectors are extracted from the current pixel block(s) of the current picture and the co-sited pixel block(s) of one or more previous pictures. In another aspect of the invention, motion vectors from surround pixel blocks of the current and previous pictures are considered as extension of the current concept.

In one aspect of the invention, off-grid position is determined based on any combination of the extracted motion vectors, current block intra/inter coded information, coded block or skipped transform information, and/or previously determined off-grid positions.

In one aspect of the invention, de-blocking is applied in conjunction with on-grid de-blocking as known in the art. In another aspect of the invention, on-grid de-blocking is applied independently using horizontal and/or vertical motion, and on luma and/or chroma.

In an embodiment, the present invention can be implemented in a TV (digital TV), a set-top-box (STB), or other digital video display and/or processing products.

In an embodiment, the present invention can be implemented in software as executed by a central processing unit. Software programming code, which can embody the present invention is typically accessed by a microprocessor from long-term, persistent storage media of some type, such as a flash drive or hard drive. The software programming code may be embodied in any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

While the invention has been particularly shown and described with reference to a preferred embodiment thereof, it will be understood by those skilled in the art that various other changes in the form and details may be made without departing from the spirit and scope of the invention.

We claim:

1. A method of motion compensated de-blocking of a current picture of a video, the method comprising:
    extracting at least one motion vector for a current pixel block of the current picture;
    operating a blocking noise positions calculation unit for calculating at least one position for the current pixel block and based on the extracted at least one motion vector, the calculating of the at least one position comprising
        retrieving decoder information and at least one prior stored position,
        determining if the current pixel block is intra-coded based upon the retrieved decoder information, and
            if so, then resetting the at least one position of the current pixel block to a zero value, and
            otherwise
                determining if the current pixel block is a skipped transformation, and
                    if so, then calculating the at least one position of the current pixel block, and
                    otherwise keeping the at least one prior stored position,
        determining if the current pixel block is an anchor frame, and
            if so, then storing the at least one calculated position, and
            otherwise keeping the at least one prior stored position; and
    operating a de-blocking filter for applying de-blocking filtering along the at least one calculated position.

2. The method of claim 1, wherein the calculating of the at least one position based on the extracted at least one motion vector comprises calculating at least one off-grid position.

3. The method of claim 1, wherein the extracted at least one motion vector is extracted from the current pixel block and from at least one co-sited pixel block of at least one previous picture of the video.

4. The method of claim 1, wherein the extracted at least one motion vector is extracted from pixel blocks of the current and previous pictures of the video that are surrounding the current pixel block.

5. The method of claim 2, wherein the calculating of the at least one off-grid position is further based on at least one of current block coded information, coded block information, skipped transform information, and previously determined off-grid positions.

6. The method of claim 2, further comprising applying de-blocking filtering to on-grid positions of the current picture.

7. The method of claim 1, wherein the de-blocking filtering is applied independently using at least one of horizontal and vertical motion, the de-blocking filtering being on at least one of a luma and chroma.

8. The method of claim 1, wherein the retrieving of the decoder information comprises:
    retrieving a coded picture type;
    retrieving intra/inter coded information;
    retrieving coded block pattern and skipped transform information; and
    retrieving the at least one motion vector from the current pixel block of the current picture and co-sited pixel blocks of at least one previous decoded picture.

9. A system for motion compensated de-blocking of a current picture of a video, the system comprising:
    a processor and memory coupled thereto and configured to:
    receive an extracted at least one motion vector;
    calculate at least one position for a current pixel block of the current picture and based on the extracted at least one motion vector, the calculating of the at least one position comprising
        retrieving decoder information and at least one prior stored position,
        determining if the current pixel block is intra-coded based upon the retrieved decoder information, and
            if so, then resetting the at least one position of the current pixel block to a zero value, and
            otherwise
                determining if the current pixel block is a skipped transformation, and
                    if so, then calculating the at least one position of the current pixel block, and
                    otherwise keeping the at least one prior stored position,
        determining if the current pixel block is an anchor frame, and
            if so, then storing the at least one calculated position, and
            otherwise keeping the at least one prior stored position; and
    apply de-blocking filtering along the at least one calculated position.

10. The system of claim 9, wherein the calculating of the at least one position based on the extracted at least one motion vector comprises calculating at least one off-grid position.

11. The system of claim 9, wherein the extracted at least one motion vector is extracted from the current pixel block and from at least one co-sited pixel block of at least one previous picture of the video.

12. The system of claim 9, wherein the extracted at least one motion vector is extracted from pixel blocks of the current and previous pictures of the video that are surrounding the current pixel block.

13. The system of claim 9, wherein the de-blocking filtering is applied independently using at least one of horizontal and vertical motion, the de-blocking filtering being on at least one of a luma and chroma.

14. The system of claim 10, wherein the calculating the of the at least one off-grid position is further based on at least one of current block coded information, coded block information, skipped transform information, and previously determined off-grid positions.

15. The system of claim 10, wherein said processor and memory are configured to apply de-blocking filtering to on-grid positions of the current picture.

* * * * *